UNITED STATES PATENT OFFICE.

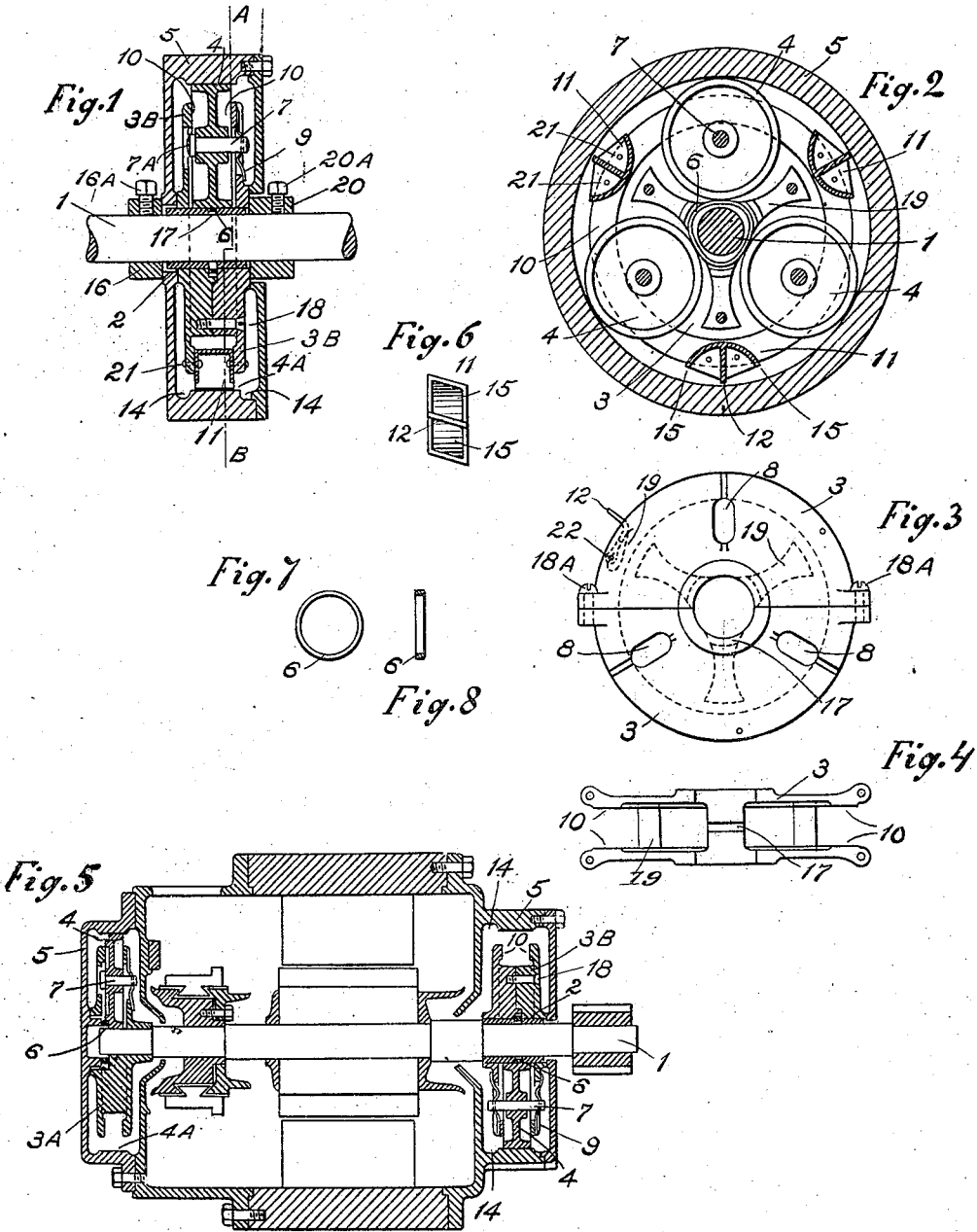

GUSTAF RENNERFELT, OF SCRANTON, PENNSYLVANIA.

ROLLER-BEARING.

No. 847,260.  Specification of Letters Patent.  Patented March 12, 1907.

Application filed December 21, 1905. Serial No. 292,696.

*To all whom it may concern:*

Be it known that I, GUSTAF RENNERFELT, a subject of the King of Sweden, and a resident of Scranton, in the county of Lackawanna and State of Pennsylvania, United States of America, have invented certain new and useful Improvements in Roller-Bearings, of which the following is a specification.

My invention relates to improvements in roller-bearings; and its object is to provide a bearing of this class which is simple and cheap in construction and efficient in operation.

I will describe my invention in the following specification and point out the novel features thereof in claims.

Referring to the drawing, Figure 1 represents in section one of my improved roller-bearings in vertical elevation. Fig. 2 is an end view of the same parts also shown in section, the section being taken through the line A B of Fig. 1. Fig. 3 is a side elevation of one of the parts of my improved roller-bearings, and Fig. 4 is a plan view of the same part. Fig. 5 is a vertical sectional view of an electric motor with my improved roller-bearings applied thereto. Fig. 6 is a view of a part which I sometimes use in conjunction with my invention. Figs. 7 and 8 are respectively end and side views of a detail which I use on my invention.

Like characters of reference designate corresponding parts in all of the figures.

1 designates a shaft or journal to which my bearing is applied.

2 designates a sleeve or bushing about the shaft which I sometimes use.

3 is a frame which I have called a "cage," and which is loosely mounted upon the shaft 1, or it may be mounted on the sleeve 2 if such a sleeve is used.

4 4 4 designate a series of rollers placed in pockets in the cage and in contact with the shaft 1.

5 designates the casing of the bearing, the inside of which is in contact with the rollers and forms a track $4^A$ for the rollers.

6 designates a flexible ring which is placed between the rollers 4 4 4 and is in contact with them. A stud 7 is provided for each of the rollers, and these studs are provided with heads $7^A$. A number of slots 8 8 8, radially disposed in the sides of the cage 3, are provided opposite the position in which the rollers are adapted to be held, and the studs 7 pass through the slots 8. The diameter of these studs is materially smaller than the width of the slots. After the rollers have been placed in position within the cage 3 a pin or wire 9 is passed through the end of each of the studs. This pin serves the purpose of holding the studs and the rollers within the frame. The ends of the pins, which are preferably made of spring-wire, are arranged to engage with the outer surface of the cage and serve the purpose of holding the studs, and thereby holding the rollers within the cage.

It may be seen that by this arrangement the rollers are somewhat loosely held in place within the cage, but the motion of the rollers is transmitted to the cage by the elastic medium of the pins. By reason of the flexibility and elasticity of the springs or pins the cage has an opportunity to move to some extent independently of the movement of the rollers. This is an important feature of my invention, because some lack of uniformity in the rollers or inaccuracies of construction of the various parts or any interference to the movement of the rollers, such as dirt or dust on the track of the rollers, will tend to cause them to travel at different rates of speed. The cage, which is driven by the rollers by reason of their being flexibly connected to it, may thus be driven without undue resistance at a speed conforming to the average speed of the rollers. This increases the efficiency and durability of my improved bearing.

The cage 3 is provided with two inner faces 10 10, which are finished surfaces. The distance between these faces is equal to the length of the rollers 4 4. The end surfaces of these rollers are also finished surfaces and are arranged to be in contact with the faces 10 10 of the cage 3. This cage provides a means for guiding the rollers in parallelism with the shaft and also performs the function of taking up any lateral thrust which may be on the bearing in a manner which will be described later. The rollers, which are preferably of short length and large diameter, will be better guided by the cage if the contact between the rollers and the cage takes place at points near the circumference or face of the rollers. For this reason the central part of the rollers is preferably made shorter than the distance between the aforesaid finished end surfaces of the rollers, so that contact takes place between the faces 10 10 and the edges or rims of the rollers and not at the hubs. The cage 3 may be formed in one piece, if desired, and this form is illustrated at 3ᴬ in the left-hand portion of Fig. 5, or, if desired, it may be constructed in two circular pieces, as is shown at 3ᴮ in Fig. 1 and in the right-hand portion of Fig. 5, held together by screws or bolts 18, or it may be constructed, as shown in Figs. 3 and 4, of two semicircular halves held together by screws 18ᴬ. Ribs 19, which form a part of this frame or cage 3, are provided to hold the finished faces 10 10 at the required distance apart. These ribs, which join the two inner faces of the cage, should be designed to give ample strength to the structure and to carry any strain which may be put upon the cage in the direction of the axis of the shaft. The diameter across the ribs 19 is preferably smaller than the diameter of the faces 10 10.

In Fig. 1 a collar 16 is shown at the left of the casing 5, rigidly mounted upon the shaft 1 by means of a set-screw 16ᴬ. This may be arranged to bear upon the outer surface of the central portion of the casing 5 and to prevent any movement of the casing 5 to the left. Thus any axial pressure to the left upon cage 3 will be transmitted to the casing 5 and arrested by the collar 16. Another construction is shown to the right of the casing, in which case a collar 20 is rigidly attached to the shaft 1 by means of a set-screw 20ᴬ. The casing 5 in this case is cut away to clear this collar 20, and the right-hand portion of cage 3ᴮ, which is adjacent to the shaft 1, is arranged to come in contact with this collar 20. Thus any movement of the bearing to the right may be arrested by the collar 20. Of course these collars 16 and 20 may be attached to any desired portion of the shaft 1, so that, if desired, there may be more or less end play to the bearing.

An annular space 17 is provided around the inner portion of the cage, which fits about the shaft or bushing. A flexible ring 6 is placed about this shaft in this annular space. This ring is normally circular in form, but is slightly larger in diameter than the distance between the rollers. As the ring is placed between these rollers it assumes a shape which is shown in exaggerated form in Fig. 2, with the portions which engage with the rollers thrust in toward its center and of course sprung out a corresponding amount at the intermediate points. The internal diameter of this ring 6 is somewhat larger than the diameter of the shaft 1 or of the bushing 2, if the latter is used, so that the ring does not come in contact with the shaft or bushing. This ring will press the rollers against the track 4ᴬ in the casing and will also form a frictional gear to connect the rollers, and will thus cause the rollers to run at the proper speed and to be geared together through the ring and through the track on the casing over which they run. This increases the efficiency of the device and also reduces and practically eliminates all noise from its operation.

Another improvement which is embodied in this bearing is my arrangement for removing dirt and dust from the working parts. The casing 5 is formed, as shown, with annular recesses 14 14 at each side of the track 4ᴬ, upon which the rollers run. These are receptacles for any dirt or dust which may be accumulated within the bearing.

I will now describe the device which I have invented for cleaning the track 4ᴬ and removing any dirt or dust or any foreign matter which might accumulate on tue track 4ᴬ and thus interfere with the free and proper working of the rollers.

11 designates a dust-scraper, and this is shown in Figs. 1, 2, and 6. It is preferably attached to the cage 3 by means of bolts or rivets 21. It is provided with a scraping-edge 12, which is arranged to be either in close proximity to the track 4ᴬ, which is the inside portion of the casing 5, or else it may be placed in actual contact with said track. A scraper may be firmly riveted to the cage, as is illustrated in Figs. 1 and 2, where two rivets 21 21 are shown. It may, however, be pivotally connected to the casing by means of one rivet 22, as is shown in Fig. 3, and arranged to swing freely about such rivet. A spring 19 may be arranged to press this scraper 12 outward, or, in some cases, the centrifugal force due to the rotation may be used for this purpose, so that it will be kept in contact with the track. I prefer to set the edge 12 of the scraper at an angle to the axis of the shaft 1, so that it will assume an oblique direction across the track, as is shown clearly in Fig. 6. This will effectively remove any dirt or dust from the track 4ᴬ and scrape it to the right or to the left, according to the direction of rotation of the shaft. The dust or dirt or other foreign matter which is thus scraped from the track 4ᴬ will be thrown into the grooves 14, which are provided as receptacles for such matter and from which it may from time to time be removed.

In the form of scraper illustrated in Figs. 1, 2, and 6 I provide flanges 15, which serve as deflectors for the dirt which is removed from the track, so that any dirt which is scraped from the track may be kept away from the inner portion of the bearing and the shaft 1.

The addition to a roller-bearing of a dust-scraper, as herein described, is a distinct and considerable improvement over former structures, inasmuch as it will facilitate the movement of the rollers and greatly add to the practical efficiency of the bearing and prolong its useful life. As is well known, it is difficult to exclude dust from a bearing of this kind. A very small amount of dust on the track will materially reduce the efficiency of the bearing—a great amount will cause its breakdown.

I have shown my improved bearing with three rollers. This is a preferred construction, as it is simple and efficient; but I may, however, use more than three rollers, if desired.

These features may be embodied in structures of many forms and designs, and I therefore do not limit myself in any way to the exact details of construction which I have herein shown and described to illustrate my invention. For example, I may make any desired number of rollers, as I have before stated, and of course may put in more than one dust-scraper, if desired, and may make the flexible connection between the guiding-cage and rollers in many ways. This bearing may be made very cheaply, and moderate inaccuracies of construction or roughness in manufacture will have but little effect upon its efficiency.

What I claim is—

1. The combination of a shaft, a plurality of rollers, a stationary track for the rollers and a frame having two parallel faces in contact with the ends of the rollers and arranged to hold the rollers in parallelism by virtue of said contact.

2. The combination of a shaft, a plurality of rollers in contact therewith, a casing surrounding the rollers and forming a track therefor, and a frame supported by the shaft, said frame having two parallel faces in contact with the ends of the rollers and arranged to hold the rollers in parallelism by virtue of said contact.

3. The combination of a shaft, a plurality of rollers in contact therewith, the rollers having finished ends at right angles to the axes, said rollers being longer near their outer circumference than at their axes, a casing surrounding the rollers and forming a track therefor, and a frame supported by the shaft, said frame having two parallel faces in contact with the ends of the rollers and arranged to hold the rollers in parallelism with the shaft by reason of said contact.

4. The combination of a shaft, a plurality of rollers, a casing surrounding the rollers and forming a track therefor, a guiding-frame having two faces rigidly connected by ribs, said faces being in contact with the ends of the rollers and arranged to hold the rollers in parallelism.

5. The combination of a shaft, a plurality of rollers, a casing surrounding the rollers and forming a track therefor, a frame having parallel faces in contact with the ends of the rollers and arranged to hold the rollers in parallelism and studs for the rollers loosely mounted in the frame.

6. The combination of a shaft, a plurality of rollers, a casing surrounding the rollers and forming a track therefor, a frame journaled upon the shaft, there being radially-disposed slots in said frame, and studs projecting from said rollers and extending into the slots.

7. The combination of a shaft, a plurality of rollers, a casing surrounding the rollers and forming a track therefor, a frame journaled upon the shaft, there being radially-disposed slots in said frame, studs projecting from said rollers and extending into the slots, and springs connecting said projecting studs to the frame.

8. The combination of a shaft, a plurality of rollers, a frame for guiding the rollers and flexible connections between the rollers and the frame.

9. The combination of a shaft, a plurality of rollers, a casing surrounding the rollers and forming a track therefor, a frame having parallel faces in contact with the ends of the rollers, studs for the rollers loosely mounted in the frame and flexible connections between the studs and the frame.

10. The combination of a shaft, a plurality of rollers, a guiding-frame for the rollers and a casing, a portion of said casing being constructed to form a dust-receptacle.

11. The combination with the associated parts of a roller-bearing, of means for automatically removing dust from the track of the rollers so as to facilitate the movement of the rollers.

12. The combination of a shaft, a plurality of rollers, a casing surrounding the rollers and forming a track for said rollers, a guiding-frame for the rollers and a dust-scraper attached to the frame.

13. The combination of a shaft, a plurality of rollers, a casing surrounding the rollers and forming a track for said rollers, a dust-receptacle in the casing, a frame for the rollers and means for removing dust from the track of the rollers.

14. The combination of a shaft, a plurality of rollers, a casing surrounding the rollers and forming a track for said rollers, a guiding-frame for the rollers, a dust-scraper attached to the frame and means for pressing the dust-scraper against the track.

15. The combination of a shaft, a plurality of rollers, a casing surrounding the rollers and forming a track for said rollers, a guiding-frame for the rollers, a dust-scraper attached to the frame and a spring for keeping the dust-scraper in contact with the track.

16. The combination of a shaft, a plurality of rollers, a casing surrounding the rollers and forming a track therefor, and a dust-scraper comprising a scraping edge and means for deflecting the dust.

17. The combination of a shaft, a plurality of rollers, a casing surrounding the rollers and forming a track therefor, and a dust-scraper placed obliquely across the track of the rollers.

18. The combination of a shaft, a plurality of rollers, a casing surrounding the rollers and forming a track therefor, a dust-scraper placed obliquely across the track of the rollers and means for deflecting the dust.

19. The combination of a shaft, a plurality of rollers, a casing surrounding the rollers and forming a track therefor, a dust-receptacle in said casing, a dust-scraper placed obliquely across the track of the rollers and means for deflecting the dust.

20. The combination of a shaft, a plurality of rollers, a casing surrounding the rollers and forming a track therefor, a frame journaled upon the shaft, there being slots in said frame, said rollers having studs materially smaller in diameter than the width of the slots arranged to project into the slots.

21. The combination of a shaft, a plurality of rollers, a casing surrounding the rollers and forming a track therefor, a frame journaled upon the shaft, there being radially-disposed slots in said frame, and studs running through the centers of the rollers and extending into the slots.

22. The combination of a shaft, a plurality of rollers in contact therewith, a casing surrounding the rollers and forming a track therefor, and a flexible ring interposed between and in frictional contact with each of the rollers.

23. The combination of a shaft, a plurality of rollers, a casing surrounding the rollers and forming a track therefor, a frame journaled on the shaft, said frame having a recess formed in its hub and a flexible ring in said recess and in contact with each of the rollers.

24. The combination of a shaft, a plurality of rollers in contact therewith, a casing surrounding the rollers and forming a track therefor, a continuous flexible ring of solid material interposed between and in frictional contact with each of the rollers, said ring having a diameter larger than the distance between the rollers.

25. The combination of a shaft, a plurality of rollers, a casing surrounding the rollers and forming a track therefor, said casing having a dust-receptacle, a frame having two parallel faces in contact with the ends of the rollers, flexible connections between the rollers and the framing, a dust-scraper attached to the frame and means for pressing the dust-scraper against the track and a flexible ring compressed between the rollers.

26. The combination of a shaft, a plurality of rollers, a casing surrounding the rollers and forming a track therefor, a dust-receptacle in said casing, a frame journaled upon the shaft, said frame having two parallel faces in contact with the ends of the rollers, flexible connections between the rollers and the frame, a flexible ring compressed between the rollers and arranged to frictionally gear the rollers together, a dust-scraper comprising a scraping edge and means for deflecting the dust, said dust-scraper being attached to the frame and placed obliquely across the track of the rollers.

27. The combination of a shaft, a plurality of rollers, a frame for guiding the rollers, springs interposed between the rollers and the frame forming flexible connections between the rollers and the frame.

28. The combination of a shaft, a plurality of rollers, and a casing forming a track for the rollers there being a recess on each side of the track of larger diameter than that of the track.

29. The combination of a shaft, a plurality of rollers, a track and a guiding-frame, said frame having a plurality of pockets of greater width than the length of the rollers, and two faces, the distance between said faces being equal to the length of the rollers.

30. The combination of a shaft, a plurality of rollers, a track therefor and a guiding-frame, said frame having a hub journaled on the shaft with openings in the hub for permitting contact between the rollers and the shaft, and having two finished faces at right angles to the axes of the rollers, said faces being in contact with both ends of the rollers and being joined together and to the hub by ribs.

31. The combination of a shaft, a plurality of rollers, a track and a guiding-frame, said frame having two faces in contact with both ends of said roller, said faces being finished in planes at right angles to the axes of the rollers, the faces being joined by ribs bearing on the shaft, the diameter across the ribs being smaller than the outer diameter of the faces.

32. The combination of a shaft, a plurality of rollers, a track and a guiding-frame, said frame having two faces cast integrally with the hub, the hub having a bearing on the shaft, and the faces being in contact with both ends of the rollers.

In testimony whereof I have signed my name to this specification in the presence of two subscribing witnesses.

GUSTAF RENNERFELT.

Witnesses:
E. A. BIDDLEMAN,
O. B. WRIGHT.